United States Patent [19]

van den Bosch

[11] 4,194,217

[45] Mar. 18, 1980

[54] METHOD AND APPARATUS FOR IN-VIVO SPECTROSCOPIC ANALYSIS

[76] Inventor: Francois J. G. van den Bosch, 11 Hillcrest Rd., Cedar Grove, N.J. 07009

[21] Appl. No.: 892,320

[22] Filed: Mar. 31, 1978

[51] Int. Cl.² .............................................. H06N 7/18
[52] U.S. Cl. ..................................... 358/93; 356/308; 356/323
[58] Field of Search ...................... 358/93; 356/39, 83, 356/95, 308, 323; 128/2 G, 2 T

[56] References Cited

U.S. PATENT DOCUMENTS

| 3,820,898 | 6/1974 | Olson ....................................... 356/83 |
| 3,886,331 | 5/1975 | Schierer ................................. 356/83 |

*Primary Examiner*—Howard W. Britton
*Attorney, Agent, or Firm*—Watson, Cole, Grindle & Watson

[57] ABSTRACT

Method and apparatus for the spectroscopic analysis of a specimen in which the specimen is irradiated with a narrow band of monochromatic light over a range of wavelengths, the light reflected from the specimen is scanned to generate a signal representative thereof, the signal is converted into a digital signal and stored. Digital data representative of selected spectroscopic characteristics is also stored and the digital data and the spectroscopic data are read out to identify the spectroscopic characteristics of the specimen. A TV camera scanner enables selective gating by varying the respective horizontal and vertical portions of the video signal. The video signal may be visually monitored to alter the scanning of the specimen and to determine those portions of the signal to be gated.

14 Claims, 5 Drawing Figures

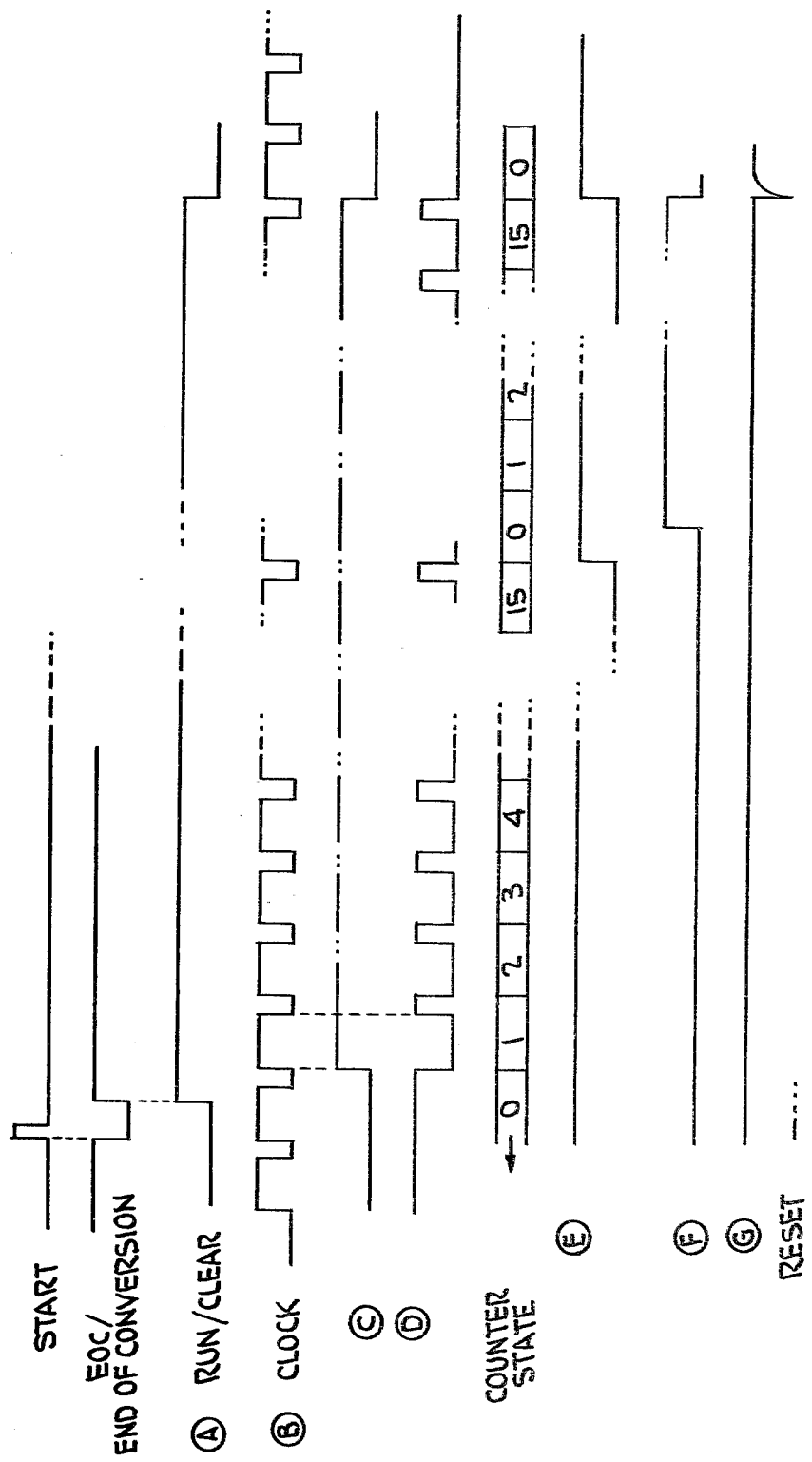

METHOD AND APPARATUS FOR IN-VIVO SPECTROSCOPIC ANALYSIS

BACKGROUND OF THE INVENTION

1. Field of The Invention

The present invention relates to method and apparatus relating to spectroscopic analysis, and more in particular to non-invasive spectroscopic method and apparatus for the in-vivo analysis of blood.

2. The Prior Art

Classical absorption spectrophotometers analyze a solution of products in glass cuvettes that are placed between a monochromating light system and a photosensor connected to a reading or recording device. Such measurements necessarily contain two elements, namely one of specific spectro-absorption and the other of optical density. The former varies with the specific wavelengths, while the latter is broad over the entire spectrum. Classical monochromator systems have become increasingly sophisticated in order to achieve the high spectral resolutions required for improved analytical accuracy. However, the costs have risen commensurately with the increases in resolution. Painstaking techniques have been employed by researchers to catalog and identify large numbers of classical chemical constituents to make possible the use of automated analyzing systems. Because freshly drawn blood plasma coagulates very quickly, blood analyses ideally should be completed in a matter of seconds in order to be accurate and to avoid the chemical changes which the blood plasma undergoes with time. Prior art spectroscopic methods for analysis of blood are most often performed in the laboratory subsequent to withdrawal of the blood plasma from the patient, and therefore are unable to be completed in sufficient time to avoid chemical changes in the blood.

SUMMARY OF THE INVENTION

In the present method and apparatus the absorption spectrogram obtained by the reflection of light from a capillary in the eye of the patient does not contain optical density components except for those present in the surrounding fluids or intervening tissures — the endothelia layer in the case of the capillary, or the tunica in the case of the artery. A spectrogram of such components can be stored in a programmable memory and subtracted from a total video signal obtained in accordance with the invention. U.S. Pat. No. 3,913,128, by the same inventor, describes a high resolution color TV microscope apparatus and confirms the fact that with a black and white TV camera as a sensor, an object or specimen can be illuminated with monochromatic light to provide different video responses than obtained with polychromatic light. The subject or specimen is illuminated with a continuous and sequential light source starting, for example, at the ultra-violet end of the visible spectrum and sweeping in a continuous manner to the infra-red end of the spectrum. This is achieved with the use of continuous interference filters giving an uninterrupted spectrum. A high resolution TV camera determines the sequence of the various pictures representing the absorption spectrum of the subject specimen under examination. The combination of optical resolution with electronic scanning techniques in accordance with the method and apparatus of the invention results in a high resolution in the spectral absorption area. For example, it takes one second to sweep the specimen from 2500 Angstroms to 10,000 Angstroms, but the TV camera has 400 lines at 90 fields per second so that in one second the specimen is scanned by some 36,000 lines. Each line can be further subdivided as there is provided a total video bandwidth of 32 MHz.

Further in accordance with the present method and apparatus, the TV camera is focussed on a capillary in the sclera of the eye which is illuminated with the aforementioned sequential continuous monochromatic light beam which is swept through the aforementioned range. The resulting signals are then digitized, stored in an electronic memory, and by using a specific counting system and gating system with the appropriate computer address, the computer will readily compare recorded spectral information with a previous recorded program resulting not only in chemical identification of the characteristics of the blood but its relationship to a previously recorded program. Live blood may thus be examined in situ in a matter of seconds.

Further in accordance with the method and apparatus of the present invention, the video signal produced by the camera is fed into an interface module where it is converted into digital form wherein, for example, 8,000 Angstroms of the central bandwidth is converted into 8,000 data words each containing four bits. One word thus represents approximately one Angstrom of wavelength. The aforementioned digital signal is then stored in a Ram type memory bank. Another Ram memory bank is stored with the absorption peaks of chemicals which lie within the 8,000 Angstrom bandwidth. Because some of the absorption peaks are broader than one Angstrom, the invention contemplates the provision of electronic retrieval of several of the words when calling for a specific absorption of a specific chemical.

Another feature of the present invention is the storing of part of one or more of several successive or spaced spectrograms achieved by a gating system allowing the three fundamental synchronization signals, namely red, green and blue, to close the gate after the third, sixth, ninth, etc., synchronization signal and opening such gate after a short time interval again for three color synchronization. Alternatively, the gate may be opened with one field pulse and closed with the next field pulse. Because the video system is used as a sequential system the data is stored sequentially or serially in the memory.

The output of the memory can be transferred through suitable electronic gating circuitry to a display monitor such that the difference between the stored program and the recorded spectrogram can be displayed. The data may also be transferred to a suitable recording mechanism, or teletype apparatus for transmission to a distant location.

The whole operation to obtain an analysis of the blood in the aforementioned manner may take only a few minutes instead of days as is now the case with prior art techniques. The operation and above features and advantages of the method and apparatus of the invention will be apparent from the following description taken in conjunction with the drawings wherein:

BRIEF DESCRIPTION OF THE DRAWINGS

FIG. 3B illustrates various timing and control signals in the circuitry of FIG. 3A; and FIG. 4 is a block diagram of a simplified system for carrying out the non-invasive spectroscopical method of the invention.

DETAILED DESCRIPTION

Classical absorption spectra may be obtained using a white light source to provide a continuous light spectrum which is passed through a colored transparent substance and wavelengths characteristic of the transparent substance are absorbed to yield an absorption spectrum. However, it is also known that partial absorption of light also takes place when light is reflected from the surface of various bodies, specimens or objects which also enables the structure and chemical components of such specimens to be identified. The reflection technique is utilized in the present invention.

As previously mentioned, U.S. Pat. No. 3,913,128 of the same inventorship as the present invention, describes a high resolution color TV microscope apparatus wherein spectra is obtained using a series of interference filters covering the desired spectrum to be analyzed. In the present invention, most of the equipment and apparatus described in the aforementioned patent is utilized with the exception that a monochromatic light beam, continuous from the ultra-violet into the near infra-red part of the spectrum, is utilized. Monochromatic light beam sources to provide such a continuous scanning of the light beam are known to those skilled in the art. For example, the monochromatic light source described in U.S. Pat. No. 3,922,092, also to the same inventor as the present invention, may be utilized.

Figure 1:
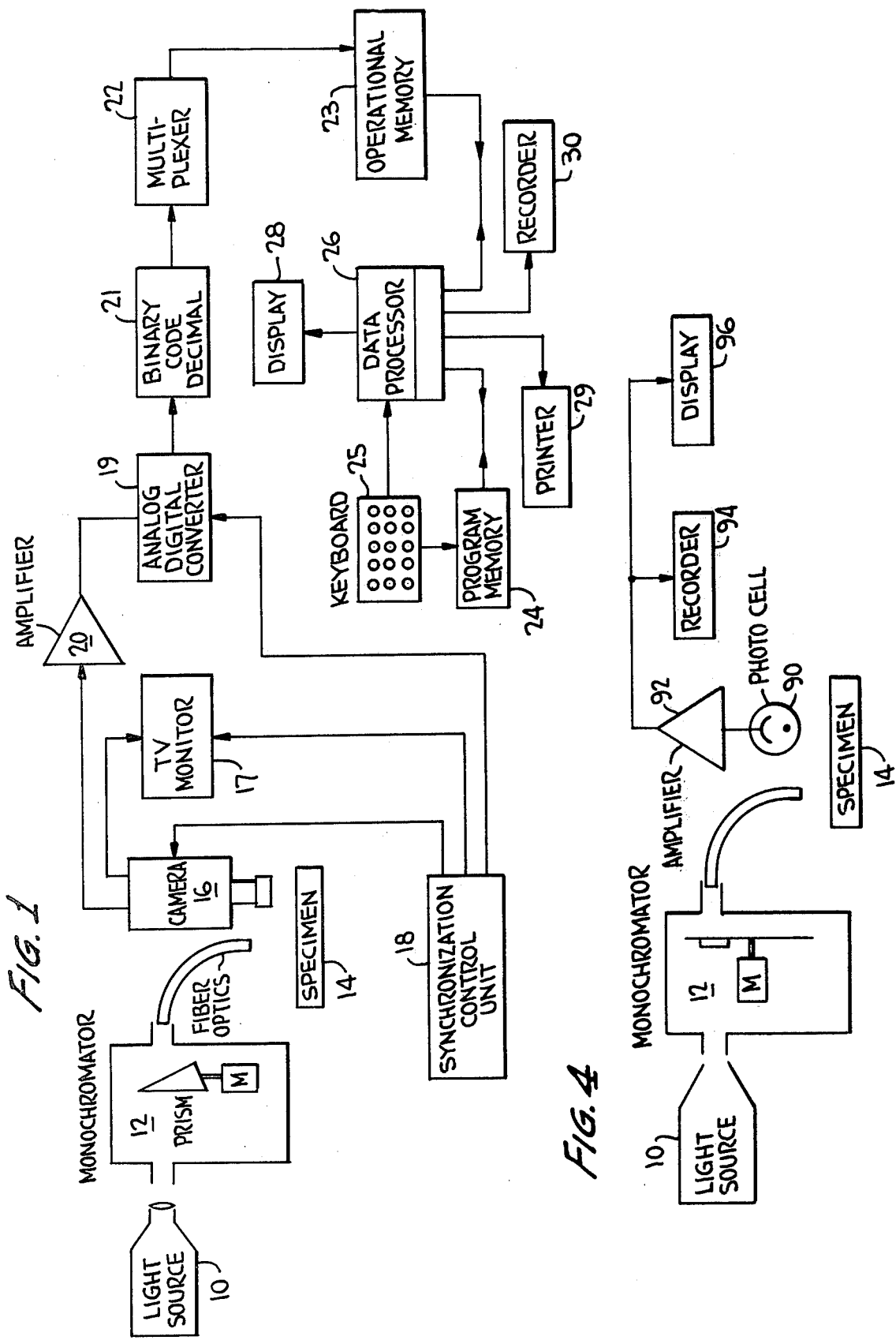
FIG. 1 is a block diagram of the apparatus of an embodiment of the present invention.

With reference to FIG. 1, light source 10 provides a white light having a spectra from the ultra-violet into the near infra-red part of the visible light spectrum which is introduced into monochromator 12 which uses a diffraction grating that is swept in incremental steps by means well known to those skilled in the art, or as described in the aforementioned U.S. Pat. No. 3,913,128. The monochromatic beam output from monochromator 12 is then directed by means of suitable optics, for example, fiber optics (not shown) onto specimen 14, which in a preferred embodiment is one of the capillaries of the sclera of the eye. High resolution TV camera 16, which is ultra-violet sensitive, receives the reflected light from the sclera of the eye and produces a resulting video signal which contains the desired absorption spectrogram. That video signal is then applied to analog/digital converter 19 via amplifier 20.

TV monitor 17 is used to adjust the light beam onto the area of the eye to which a spectrum is to be taken. Synchronization control unit 18 applies suitable control signals to synchronize the operation of camera 16, TV monitor 17 and analog/digital converter 19, in accordance with the synchronous operation of TV camera 16.

Analog/digital converter 19 converts the amplified video analog signal from TV camera 16 into suitable digital form for further processing in accordance with the method and apparatus of the invention. The digital output from analog/digital converter 19 is coded into decimal by binary-to-decimal coder 21 and input to multiplexer 22 which presents the digital data into a sequential or serial manner to operational memory 23.

Operational memory 23 is preferably a random access memory (RAM). Programmable memory 24 is programmed with standard absorption peaks representing known chemical components and constituents of the blood by keyboard 25. Data processor 26 controlled by keyboard 25 receives data from operational memory 23 and programmable memory 24 and provides an output to display 28, such as a CRT display, for purposes of comparing the operational and programmed data. Thus, the operational and stored spectroscopic data can be visually compared to determine the blood contents of the specimen. Alternatively, the information in data processor 26 can be printed by printer 29, or recorded on, for example magnetic tape by recorder 30. Thus, the above-described system enables the analyzed spectrum from the specimen to be simultaneously displayed or recorded with programmed absorption data such that the differences, if any, between the blood sample and the stored blood sample may be readily determined.

Figure 2:
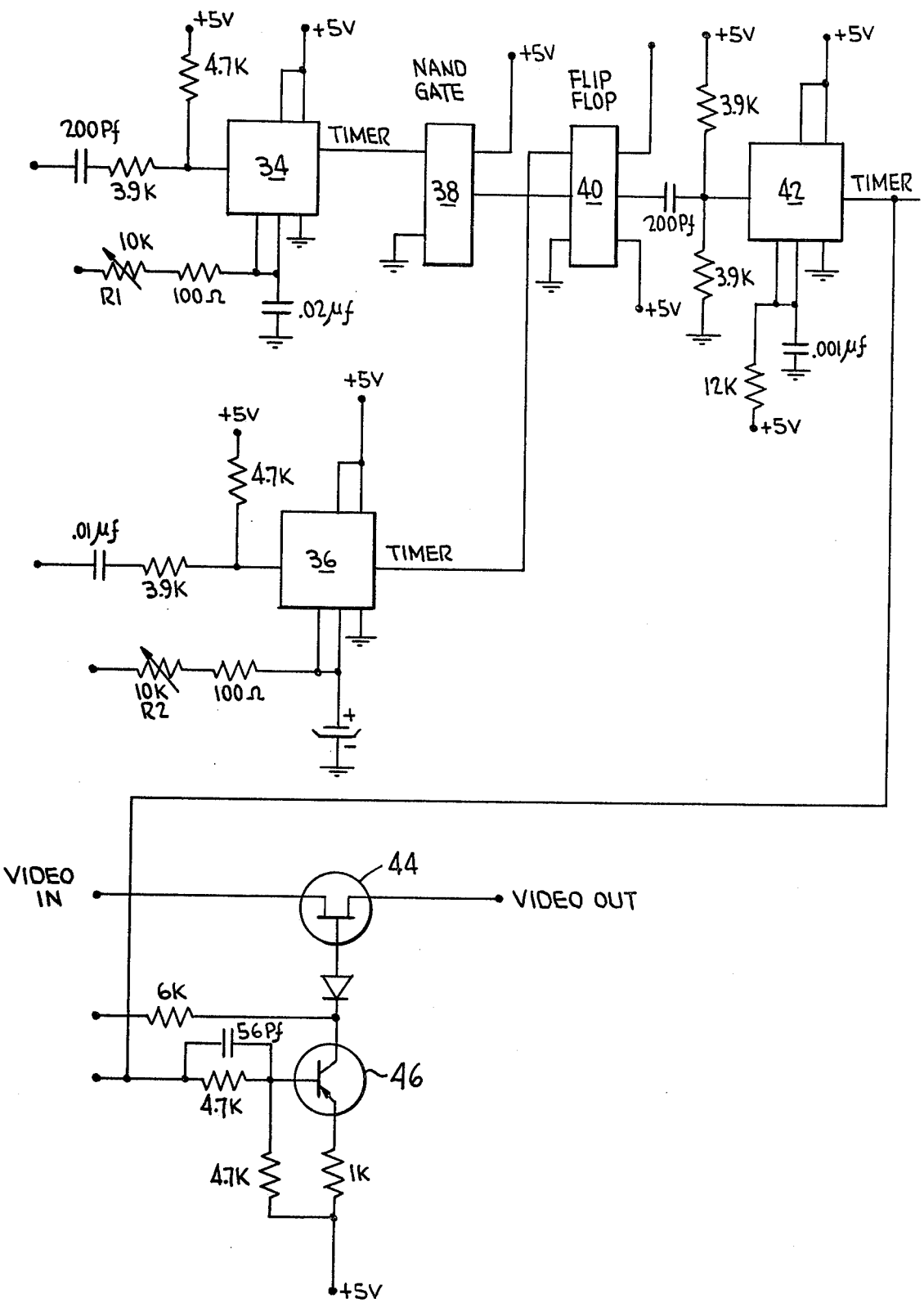
FIG. 2 is a circuit diagram of a gating circuit used with the present invention.

The gating system illustrated in FIG. 2 and which forms part of synchronization control unit 18 has the following structure and operation. Timer 34 of the gating circuit generates a variable delayed vertical gate pulse which is obtained by using vertical pulse from sync generator control circuit 18. The variable delay is obtained by variable resistor R1. A horizontal pulse, also from sync generator data selection circuit 18, is also delayed by varying resistor R2 in timer circuit 36 to provide a delayed horizontal gate pulse. The output of timer 34 is inverted by NAND gate 38 and applied along with the output of timer 36 to flip-flop 40. The output of flip-flop 40 is applied to mixer circuit 42 to obtain a control signal representing a variable gating pulse which can be applied to monitor 30 (FIG. 1) such that a small portion of a line of the video signal is displayed on top of the raster of the monitor. That line can be moved horizontally and vertically with the adjustment of resistors R1 and R2 to respectively vary the vertical and horizontal video gate pulses. The output signal from mixer 42 is also applied to the base of field effect transistors (FET) 44 through driver transistor 46. The video signal from high resolution camera 16 is applied to the emitter of FET 44 and the video output which is selectively gated by the previously mentioned control pulse is taken from the collector of the FET.

As mentioned previously, the selected video output from FET 44 is then provided to analog/digital converter 19 to generate appropriate digital information for further processing in the system. The output of the analog/digital converter 19 (FIG. 1) is input to binary/decimal coder 21, which information is serialized by multiplexer 22 and then input to operational memory 23.

The following is a description of the analog/digital converter 19, binary/decimal coder 21 and multiplexer 22.

The video output signal from FET 44 (shown in FIG. 2) is then applied to one input of NAND gate 50; the output of the NAND gate is inverted by inverter 52 and input to analog/digital converter 19. Analog/digital converter 19 may be of any type known to those skilled in the art but is preferably an eight-bit converter such as that furnished by Datel Systems Inc. of Canton, Massachusetts, Model ADC-EH8 B1 or B2. As indicated previously, the output of analog/digital converter 19 is input to binary decimal coder 21 which may, for example, be of the type SN54184A or SN54185A, manufactured by Texas Instruments Incorporated, Dallas, Texas. The eight digit output from binary decimal coder 21 is divided into two groups, namely an A and B group as illustrated in FIG. 3. The B group of digits is applied directly to multiplexer 22 through respective NAND gates 53a–53d, and the second group of digits A is applied to the respective terminals of exclusive OR gates 54, 56 through respective NAND gates 55a–55d. The respective outputs of exclusive OR gates 54, 56 are input to respective terminals of exclusive OR gate 58. The output of exclusive OR gate 58 is in turn input to one terminal of exclusive OR gate 60. The other terminal of exclusive OR gate 60 is applied to either a plus 5 volt or ground terminal depending upon whether a positive or negative output signal is desired.

An end of conversion signal (EOC) from analog/digital converter 19 is inverted by inverter 62 and applied to one input of flip-flop 64 to terminate the eight-bit conversion cycle. Oscillator 66 provides a clock signal illustrated as signal B in FIG. 3B. A run/clear signal output from flip-flop 64 (signal A in FIG. 3B) is input to flip-flop 68 along with clock signal B. Output signal C (reference FIG. 3B) from flip-flop 68 is provided to one input of NAND gate 70 along with clock signal B to generate count pulses D which are input to feedback and control counter 72. The outputs from counter 72 control the sequential output from multiplexer 22. A control signal output from counter 72 is also provided to flip-flop 64 and NAND gate 50 to maintain those elements in proper condition during a count sequence.

An output from binary counter 72 is inverted by inverter 74 before being applied to flip-flop 76, which controls the gating of either digit sequences A or B (as previously described) for application to the input of multiplexer 22. The group B digits are referred to as the most significant bits and the A group digits the least significant bits. Reset signal from output A of flip-flop 76 is inverted by inverter 78 fed back to the reset terminal of flip-flop 64. The "B" output from flip-flop 76 controls NAND gates 53a–53d, and the "A" output from flip-flop 76 controls NAND gates 21a–21d. Manual clear switch 80 is also provided to manually clear flip-flop 64.

Figure 3A:
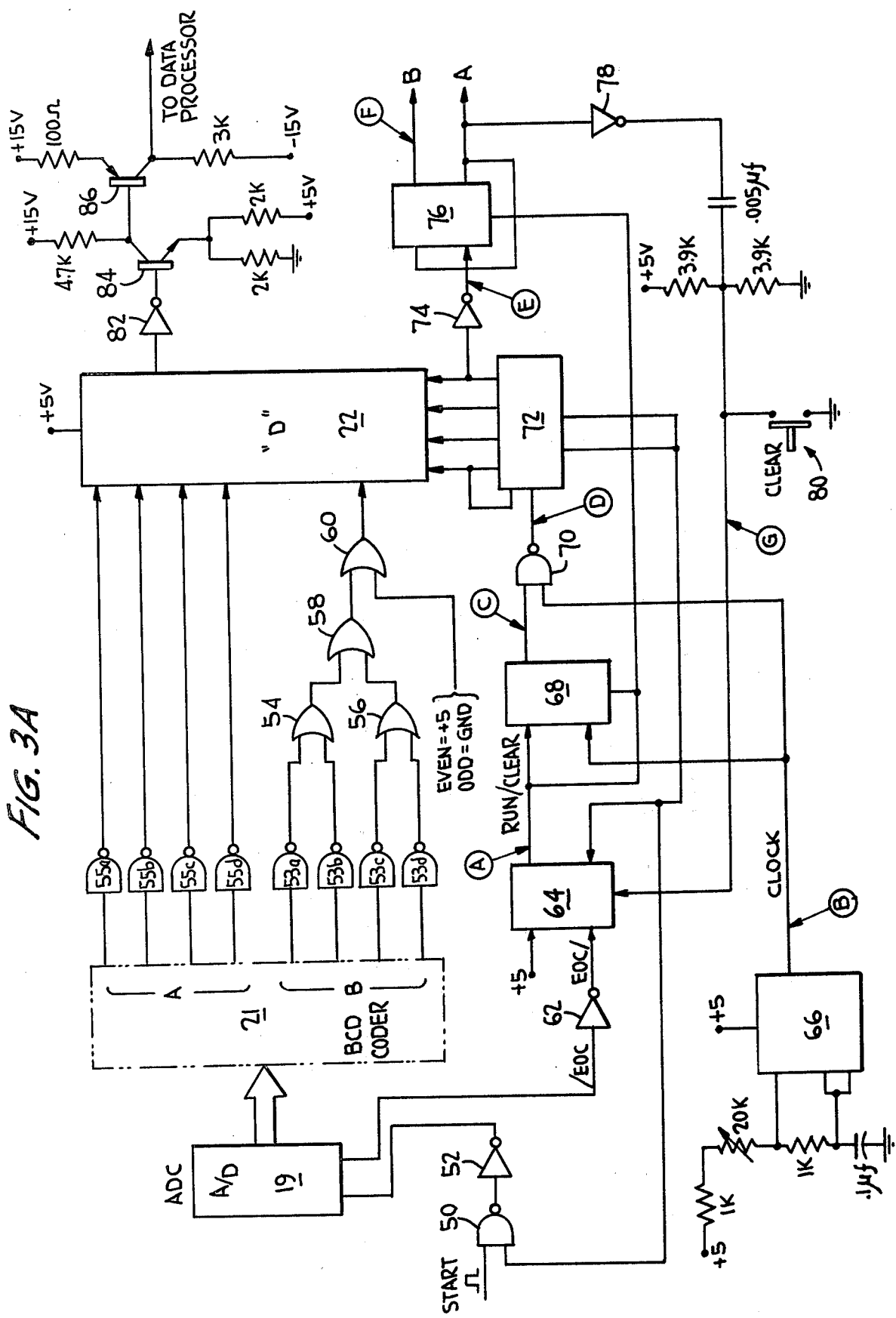
FIG. 3A is a block diagram of the interface and circuitry for controlling the multiplexer of the present invention.

The output from multiplexer 22 is inverted by inverter 82 and applied to the base of amplifying transistor 84, the collector of which is connected to the base of amplifying transistor 86 as illustrated in FIG. 3A. The output from the emitter of amplifying transistor 86 is input to data processor 26.

FIG. 4 illustrates a modification of an embodiment of the present invention for obtaining a non-invasive spectroscopical analysis of, for example, blood as described previously. A light source 10 and monochromator 12 are as previously described and the light output from monochromator 12 is reflected from specimen 14. The reflected light from specimen 14 is detected by photocell 90, the output of which is amplified by amplifier 92 and either recorded by recorder 94 or displayed by display 96 in accordance with the desires of the operator. In this embodiment, of course, the reflected light from the specimen is no longer scanned by a camera, but the sequential outputs of photocell 90 represent the spectroscopic data as contained in the reflected light from the specimen.

As indicated in FIG. 1, keyboard 25 addresses programmed memory 24 for the purpose of inserting digital data therein representative of known spectroscopic characteristics of the specimen and also controls data processor 26. The addressing of programmed memory 24 and the control of data processor 26 are known to those skilled in the art such that no elaboration of such addressing and control function is considered necessary for practicing the invention. Display 28, printer 29 and recorder 30 are standard components known to those skilled in the art and therefore no description of their structure and operation is believed to be necessary for the invention to be carried out.

The oscillator 66 in FIG. 3A preferably operates at a frequency of 32 MHz.

What is claimed is:

1. Apparatus for the spectroscopic analysis of a specimen, comprising:
    first means for scanning the specimen with a narrow band of a monochromatic light over a range of wavelengths;
    second means for scanning the light reflected from said specimen and generating a signal representative thereof;
    means for selectively gating a portion of said signal;
    means for converting the gated signal into a digital signal;
    means for storing said digital signal;
    means for storing digital data representative of selected spectroscopic characteristics; and
    means for reading out said digital data and said spectroscopic data to identify the spectroscopic characteristics of said specimen.

2. Apparatus as in claim 1 wherein said means for converting includes a binary coded decimal converter responsive to said digital signal and means for multiplexing the decimally coded data into said digital signal having a serial format.

3. Apparatus as in claim 1 further comprising means for visually monitoring the scanned signal and the selective gating of said signal.

4. Apparatus as in claim 1 wherein said digital data includes words having eight bits wherein each bit represents one angstrom of said monochromatic light.

5. Apparatus as in claim 4 wherein said range of wavelengths extends from the ultra-violet to the near infra-red.

6. Apparatus as in claim 1 wherein said means for reading out is a cathode ray tube display.

7. Apparatus as in claim 1 wherein said means for reading out is a printer.

8. Apparatus as in claim 1 wherein said means for reading out is a recorder.

9. Apparatus as in claim 1 wherein said second means for scanning is a TV camera and said means for selectively gating includes means for varying the horizontal and vertical components of the video signal generated by said TV camera.

10. Apparatus as in claim 1 wherein said specimen is the sclera of the eye and the spectroscopic analysis identifies the spectroscopic characteristics of the blood.

11. Apparatus for the spectroscopic analysis of a specimen, comprising:
    means for scanning the specimen with a narrow band of monochromatic light over a range of wavelengths;
    means for detecting the light reflected from said specimen and generating a signal representative thereof;
    means for amplifying said signal; and
    means for recording the amplified signal.

12. Method for spectroscopic analysis of a specimen, comprising the steps of:

scanning the specimen with a narrow band of monochromatic light over a range of wavelengths;

scanning light reflected from said specimen and generating a signal representative thereof;

selectively gating a portion of said signal;

converting said signal into a digital signal;

storing said digital signal;

storing digital data representative of selected spectroscopic characteristics; and reading out the digital data and said spectroscopic data to identify the spectroscopic characteristics of said specimen.

13. A method as in claim 12 wherein the step of converting includes the step of decimal to binary conversion and multiplexing the decimally coded data into said digital signal having a serial format.

14. The method as in claim 12 wherein said step of scanning the light reflected from said specimen uses a TV camera and said step of selectively gating includes the step of varying the horizontal and vertical components of the video signal generated by the TV camera.

* * * * *